(12) United States Patent
Lu

(10) Patent No.: US 8,740,474 B2
(45) Date of Patent: Jun. 3, 2014

(54) METHODS FOR PROCESSING A MULTI-FIBER FERRULE

(75) Inventor: Yu Lu, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 28 days.

(21) Appl. No.: 13/445,096

(22) Filed: Apr. 12, 2012

(65) Prior Publication Data

US 2012/0263422 A1    Oct. 18, 2012

Related U.S. Application Data

(60) Provisional application No. 61/474,545, filed on Apr. 12, 2011.

(51) Int. Cl.
*G02B 6/36* (2006.01)
*G02B 6/38* (2006.01)

(52) U.S. Cl.
CPC ............ *G02B 6/3688* (2013.01); *G02B 6/3684* (2013.01); *G02B 6/3833* (2013.01)
USPC .................. 385/85; 385/76; 385/77; 385/78; 385/84; 451/28; 451/41; 156/153

(58) Field of Classification Search
CPC .................... G02B 6/3688; G02B 2006/12171
USPC ........................................................ 385/85
See application file for complete search history.

(56) References Cited

U.S. PATENT DOCUMENTS

| | | | |
|---|---|---|---|
| 5,317,661 | A | 5/1994 | Szentesi et al. |
| 6,106,368 | A | 8/2000 | Childers et al. |
| 6,361,219 | B1 | 3/2002 | Blyler, Jr. et al. |
| 6,957,920 | B2 | 10/2005 | Luther et al. |
| 2004/0086235 | A1 | 5/2004 | Natori et al. |
| 2005/0036742 | A1* | 2/2005 | Dean et al. ...................... 385/71 |
| 2005/0180702 | A1 | 8/2005 | Kevern et al. |
| 2005/0232564 | A1* | 10/2005 | Jones et al. ................... 385/134 |
| 2006/0072879 | A1 | 4/2006 | Yang et al. |
| 2009/0041412 | A1* | 2/2009 | Danley et al. ................... 385/85 |
| 2010/0129031 | A1 | 5/2010 | Danley et al. |
| 2010/0303419 | A1* | 12/2010 | Benjamin et al. ............... 385/72 |

OTHER PUBLICATIONS

G3 RM/HS Series 10-20W Pulsed Fiber Lasers With GTWave and PulseTune Technology, SPI Lasers LLC, spilasers.com, 2010 (2 pages).
International Search Report and Written Opinion mailed Oct. 31, 2012.

* cited by examiner

*Primary Examiner* — Ryan Lepisto
(74) *Attorney, Agent, or Firm* — Merchant & Gould P.C.

(57) ABSTRACT

A method for processing ferrules for fiber optic connectors is disclosed herein. The method involves ablating a distal end face of the ferrule with the plurality of laser beam pulses to remove a distal layer of the ferrule without removing an optical fiber secured within the ferrule. By removing the distal layer from the ferrule, the optical fiber is caused to protrude distally outwardly from the distal end of the ferrule by a desired amount.

18 Claims, 4 Drawing Sheets

METHODS FOR PROCESSING A MULTI-FIBER FERRULE

CROSS-REFERENCE TO RELATED APPLICATION

The present application claims the benefit of U.S. Provisional Patent Application Ser. No. 61/474,545, filed Apr. 12, 2011, which application is hereby incorporated by reference in its entirety.

TECHNICAL FIELD

The present disclosure relates generally to methods for processing components of fiber optic connectors. More particularly, the present disclosure relates to methods for processing multi-fiber ferrules used in multi-fiber fiber optic connectors.

BACKGROUND

Fiber optic communication systems are becoming prevalent in part because service providers want to deliver high band width communication capabilities (e.g., data and voice) to customers. Fiber optic communication systems employ a network of fiber optic cables to transmit large volumes of data and voice signals over relatively long distances. Fiber optic connectors are an important part of most fiber optic communication systems. Fiber optic connectors allow optical fibers to be quickly optically connected without requiring a splice. Fiber optic connectors can include single fiber connectors and multi-fiber connectors.

A typical multi-fiber fiber optic connector includes a ferrule assembly supported at a distal end of a connector housing. The ferrule assembly can include a multi-fiber ferrule mounted in a hub. A spring is used to bias the ferrule assembly in a distal direction relative to the connector housing. The multi-fiber ferrule functions to support the end portions of multiple optical fibers. The multi-fiber ferrule has a distal end face at which polished ends of the optical fibers are located. When two multi-fiber fiber optic connectors are interconnected, the distal end faces of the multi-fiber ferrules oppose and are biased toward one another by their respective springs. With the multi-fiber fiber optic connectors connected, their respective optical fibers are coaxially aligned such that the end faces of the optical fibers directly oppose one another. In this way, optical signals can be transmitted from optical fiber to optical fiber through the aligned end faces of the optical fibers.

As indicated above, multi-fiber ferrules are configured for supporting the ends of multiple optical fibers. Typically, the optical fibers are arranged in one or more rows within the multi-fiber ferrule. When two multi-fiber ferrules are interconnected, the fibers of the rows of optical fibers align with one another. For most multi-fiber ferrules, it is desirable for the optical fibers to protrude distally outwardly from the distal end faces of the multi-fiber ferrules. This type of protrusion can assist in making physical fiber-to-fiber contact when two multi-fiber connectors are mated. U.S. Pat. No. 6,957,920, which is hereby incorporated by reference in its entirety, discloses a multi-fiber ferrule having protruding optical fibers of the type described above.

Currently, multi-fiber ferrules are made of a material that is softer than the material of the optical fibers. The difference in hardness between the multi-fiber ferrule and its corresponding optical fibers allows polishing processes to be used for generating optical fiber protrusions. Specifically, slurry or flock films are used to simultaneously polish both the end face of the ferrule and the corresponding optical fibers supported by the ferrule. Because the material composition of the ferrule is softer than the material composition of the optical fibers, the ferrule material is removed at a faster rate than the optical fiber material thereby causing the optical fibers to protrude from the end face of the ferrule after the polishing process. U.S. Pat. No. 6,106,368 discloses a flock film based polishing process of the type described.

Generating optical fiber protrusions via the methods described above can present a number of issues. First, the processes can be time consuming and require the use of relatively expensive consumables. Furthermore, polishing processes generate considerable residue and require substantial cleaning operations. Moreover, while the processes described above provide can be used to increase the optical fiber height at the end face of a ferrule, other end face geometries of the optical fiber (e.g., tilt angle and radius) are also impacted.

SUMMARY

Certain aspects of the present disclosure relate to methods for processing ferrules of fiber optic connectors. In one embodiment, a micro-machining process utilizing nanosecond pulsing of a laser is used to remove (e.g., ablate) an end portion of a ferrule while not removing a corresponding optical fiber secured within the ferrule. In this way, an optical fiber protrusion from the end of the ferrule can be provided or increased. Other aspects of the present disclosure relates to utilizing nanosecond pulsing of a laser to shape a ferrule.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

The present disclosure relates generally to a process for causing an optical fiber to protrude outwardly from the end face of a ferrule. In certain embodiments, a laser is used to remove portions of the ferrule so as to expose a protruding portion of an optical fiber held within the ferrule. In certain embodiments, characteristics of the laser (focal spot intensity, interaction time, wave length, pulse length) are selected so that the laser effectively removes the material of the ferrule without ablating the optical fiber held within the ferrule. In certain embodiments, the laser is used in a micro-machining process in which nanosecond pulsing of the laser removes material at the end face of the ferrule at the micron level. By selecting suitable the laser wave length, power density and pulse properties, it is possible for the laser to remove the ferrule material to a controlled depth, while leaving the optical fiber intact. In this way, an optical fiber protrusion above the ferrule end face is provided by removing a layer of ferrule material using a laser.

Figure 2:
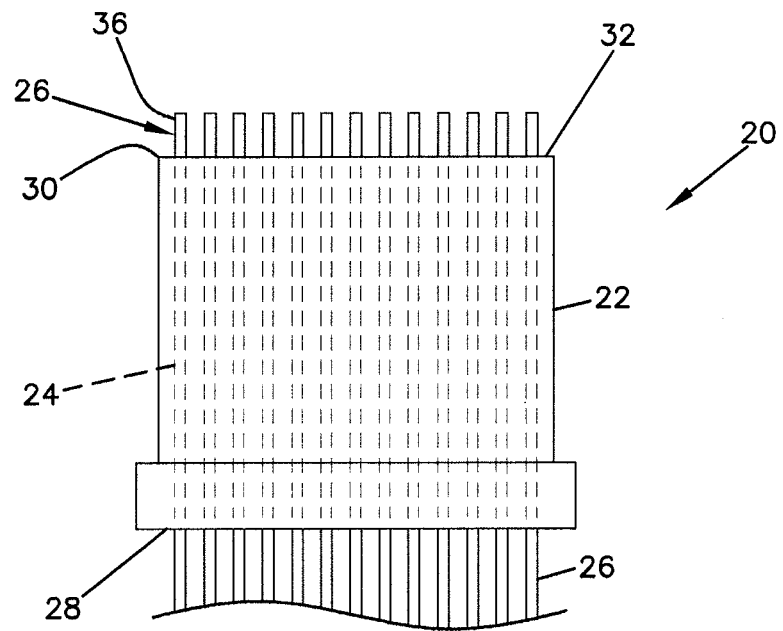
FIG. 2 is a side view of a multi-fiber ferrule after having been processed according to a first step of the method of FIG. 1.
Figure 3:
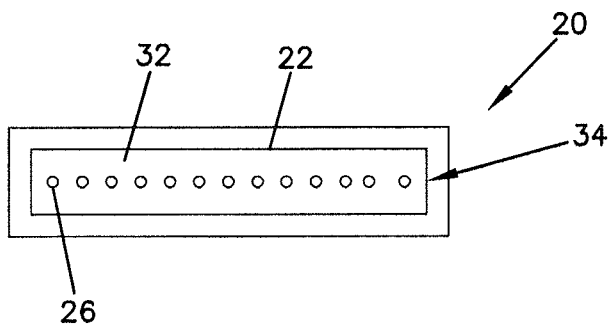
FIG. 3 is an end view of the ferrule of FIG. 2.

Methods in accordance with the principles of the present disclosure can relate to processes for removing material from a ferrule such as a multi-fiber ferrule. An example multi-fiber ferrule 20 for use with a multi-fiber fiber optic connector is shown at FIGS. 2 and 3. The ferrule 20 has a ferrule body 22 defining a plurality of parallel openings 24 for receiving optical fibers 26. The openings 24 extend through the ferrule body 22 from a proximal end 28 of the ferrule body 22 to a distal end 30 of the ferrule body 22. In certain embodiments, the openings 24 are parallel with respect to alignment pins (not shown) mounted within the ferrule body 22 or pin receiving openings (not shown) defined within the ferrule body 22. The distal end 30 of the ferrule body 22 defines a distal end face 32 that faces in a distal direction. Referring to FIG. 3, the openings 24 defined through the ferrule body 22 are aligned along a row 34. As depicted, the plurality of openings 24 include 12 separate openings. Of course, in other embodiments, different numbers of openings can be provided. Additionally, in further embodiments, multiple rows of openings may be provided.

It will be appreciated that the ferrule body 22 can be made of various different materials. For example, in one embodiment, the ferrule body can be manufactured from a thermoset material such as an epoxy that thermosets within a mold to form the desired shape of the ferrule body 22. In other embodiments, the ferrule body 22 can be made of a plastic material. For example, in one embodiment, the ferrule body can be made via an injection molding process using a thermoplastic material such as polyphenylene sulfide (PPS). In certain embodiments, reinforcing members such as glass beads can be incorporated into the thermoplastic or thermoset material to reduce shrinkage.

Figure 1:
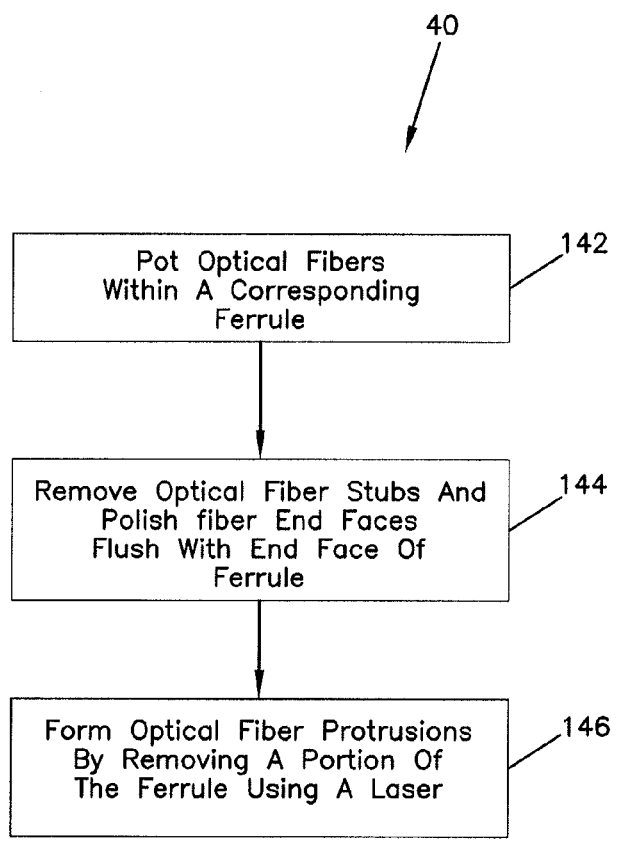
FIG. 1 is a flow chart illustrating a method for processing a multi-fiber ferrule in accordance with the principles of the present disclosure.

FIG. 1 shows a method 40 for processing the multi-fiber ferrule 20. Step 142 of the method 40 relates to potting the optical fibers 26 within the openings 24 of the ferrule body 22. Preferably, the optical fibers 26 are potted within the openings 24 by bonding the optical fibers within the openings 24 using an adhesive such as epoxy. FIGS. 2 and 3 show the optical fibers 26 potted within the ferrule body 22. As shown at FIGS. 2 and 3, the optical fibers 26 are potted within the ferrule body 22 with stub ends 36 of the optical fibers 26 projecting distally beyond the distal end face 32 of the ferrule body 22.

Figure 4:
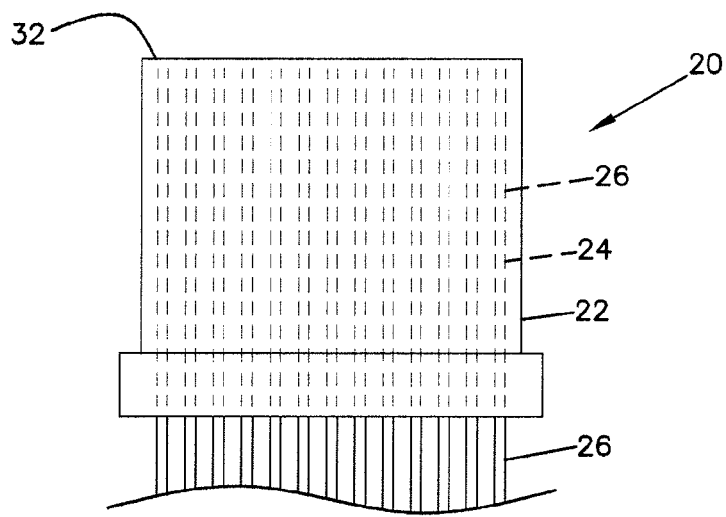
FIG. 4 is a side view of the ferrule after having been processed according to a second step of the method of FIG. 1.

At step 144 of the method 40 of FIG. 1, the fiber stubs are removed (e.g., by a cleaving process) and the distal end faces of the optical fibers are polished until the distal end faces of the optical fibers are even (i.e., flush) with the distal end face 32 of the ferrule body 22 as shown at FIG. 4. It will be appreciated that an angled polish or a non-angled polish can be used. For example, in the case of single mode optical fibers, the end face 32 of the ferrule and end faces of the optical fibers 26 can be polished such that the end faces are aligned along a plane angled eight degrees relative to a plane perpendicular to the central axes of the optical fibers. In the case of multi mode optical fibers, the distal end face 32 of the ferrule as well as the distal end faces of the optical fibers can be polished to a plane that is zero degrees relative to the plane that is perpendicular to the longitudinal axes of the optical fibers.

Figure 5:
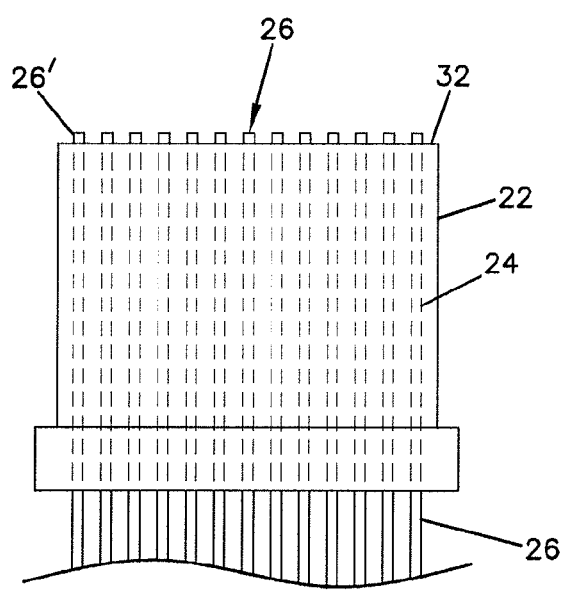
FIG. 5 is a side view of the ferrule after having been processed according to a third step of the method of FIG. 1.

At step 146 of the method 40 of FIG. 1, a laser is used to remove a distal layer of the ferrule body 22 from the distal end face 32 of the ferrule body 22 without removing the end portions of the optical fibers 26. In this way, fiber protrusions 26' are created that project distally beyond the distal end face 32 of the ferrule 22 (see FIG. 5). Preferably, the laser is scanned across the distal end face 32 of the ferrule body 22 to remove material from the ferrule body 22 at the micron level. In certain embodiments, at least one micron of material is removed from the distal end face 32 of the ferrule 20 such that the optical fibers 26 project at least one micron outwardly from the end face 32 of the ferrule body 22. In other embodiments, at least two or three microns of material are removed from the distal end face 32 of the ferrule body 22 such that the optical fibers 26 protrude at least two or three microns beyond the distal end face 32 of the ferrule body 22. In still other embodiments, a layer having a depth/thickness of at least five, ten or fifteen microns is removed from the distal end of the ferrule body 22 such that the optical fibers 26 protrude at least five, ten or fifteen microns distally beyond the resultant distal end face 32 of the ferrule body 22. In certain embodiments, the laser beam pulse interaction locations/focal points can be moved (i.e., indexed, scanned) progressively across the distal end face of the ferrule such that upon completion of the micro-machining, substantially full coverage of the ferrule end face has been achieved. In this way, on average, a substantially uniform thickness of material is removed from the entire end face of the ferrule. It will be appreciated that at the submicron level an array of adjacent depressions/craters are formed in the end face of the ferrule. The movement of the focal points can be in a linear pattern, a criss-cross pattern or other patterns. The movement can also be random. Typically, the laser will be moved/indexed after a predetermined number of pulses have been applied to a given interaction location such that a predetermined depth of ferrule material is removed from the interaction location.

Figure 6:
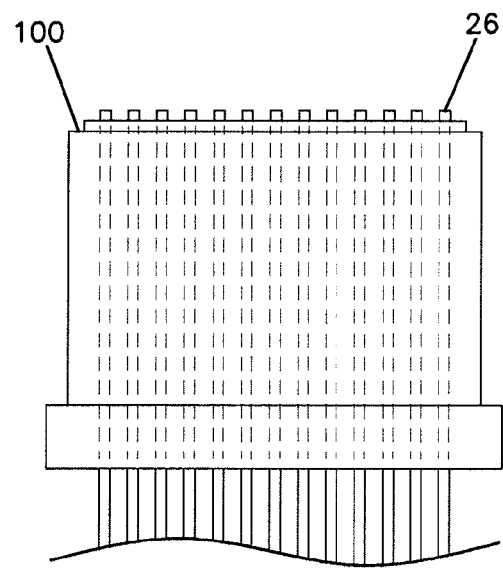
FIG. 6 is a side view of another multi-fiber ferrule processed with a method in accordance with the principles of the present disclosure.
Figure 7:
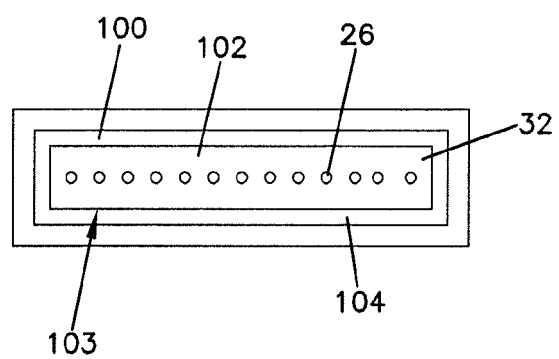
FIG. 7 is an end view of the multi-fiber ferrule of FIG. 6.

After the laser has been used to remove the desired thickness of material from the distal end face 32 of the ferrule body 22, a subsequent polishing step can be used to adjust/control the protrusion heights of the fibers and can also be used to alter the geometries of the end faces of the optical fibers. For example, in certain embodiments, a polishing process can be used to round or dome the distal end faces of the optical fibers to a desired radius. Additionally, the laser can also be used to form additional structures within the ferrule body. For example, as shown at FIGS. 6 and 7, the laser can be used to ablate a peripheral portion 100 of the distal end face 32 that surrounds a central region 102 of the end face 32 through which the optical fibers 26 extend. In this way, a center platform 103 surrounded by a recessed region 104 is provided at the end face of the ferrule body. An example patent showing a multi-fiber ferrule having a distal end face with peripheral portions of the end face recessed relative to a central portion of the end face is shown in United States Patent Application Publication No. U.S. 2005/0180702, which is hereby incorporated by reference in its entirety.

In other embodiments, the optical fibers can be laser cleaved after being potted in the ferrule body. Laser cleaving can be used to provide the end faces of the optical fibers with desired characteristics such as tilt angle and radius. After laser cleaving, another laser can be used to remove portions of the ferrule body to cause end portions of the optical fibers potted within the ferrule body to protrude distally outwardly from the distal end face of the ferrule body. The laser used to cleave the fibers typically generates a laser beam having a substantially different wavelength as compared to the laser beam used to remove the ferrule material from the end face of the ferrule. In certain embodiments, the cleaving laser can be a $CO_2$ laser. By using this type of process, the number of polishing steps utilized can be reduced or eliminated. In certain embodiments, the optical fibers can protrude slightly beyond the end face of the ferrule after potting and laser cleaving and the face of the ferrule can subsequently be micro-machined using a pulse laser to increase the protrusion lengths of the optical fibers. In other embodiments, the optical fibers can be laser cleaved before potting, and then the fibers can subsequently be potted in the ferrule at a desired protrusion height (e.g., flush or with a positive protrusion height). Micro-machining using a pulse laser can therefore be used to increase the protrusion height if a protrusion height already exists, or to create a protrusion if the end faces of the fibers are initially flush with the ferrule end face.

In certain embodiments, pulsed fiber laser devices can be used to generate the laser beams for use in ablating the outer layers of the distal face of a ferrule without ablating the optical fibers. An example series of laser devices suitable for micro-machining ferrules in the manner described above include the G3 RM/HS series 10-20 W pulsed fiber lasers which are sold by SPI Lasers UK Ltd, of South Hampton, UK.

As described above, the lasers used in ablating the distal surfaces of ferrules in accordance with the present disclosure preferably have laser beam characteristics selected to allow the laser beams to ablate the material of the ferrule body 22 without substantially ablating the optical fibers 26 potted within the ferrule body 22. Preferably, the laser beams are applied to the surface of the ferrule in a pulsed manner with an interaction time (i.e., a pulse length) that is less than $10^{-3}$ seconds, and a focal spot intensity (i.e., a power density) that is in the range of $10^3$ to $10^9$ watts per square centimeter. The number of pulses/interaction times per ablation location can be selected to remove a desired depth of material. By selecting the appropriate focal spot intensities and interaction times for the laser beam pulses, the depth the laser beams ablate into the surface of the ferrule with each pulse can be precisely controlled and layers of the ferrule beneath the desired depth are not compromised. Additionally, in certain embodiments, the wavelengths of the laser beams are selected so as to be suitable for ablating the material of the ferrule without substantially ablating or damaging the material of the optical fibers (i.e., glass/silica). In certain embodiments, the wave lengths of the laser beam are in the range of 200 to 3000 nanometers (0.2 micrometers to 3.0 micrometers). In other embodiments, the wave lengths of the laser beam are less than 3000 nanometers. Preferably, the lasers have relatively high focal spot intensities (i.e., power densities in watts per cubic centimeter) and relatively short pulse lengths/durations (i.e., interaction times). In one embodiment the focal spot intensity is at least $10^3$ watts per cubic centimeters, and the interaction time is less than $10^{-3}$ seconds. In other embodiments, the focal spot intensity is in the range of $10^3$ to $10^9$ watts per $cm^2$ and the interaction time is in the range of $10^{-9}$ to $10^{-3}$ seconds.

While numerous characteristics of the laser beams have been described above, it will be appreciated that the characteristics of the laser beam used are dependent upon the material of the ferrule, material of the optical fibers, and the desired ablation rate. Hence, lasers having characteristics outside of the various ranges described herein are included within the scope of the present disclosure.

While the embodiments described above use a laser in the micro-machining process, it will be understood that other micro-machining techniques for removing/ablating the end material of a ferrule can be used as well. For example, micromechanical machining techniques using micro or nano-mechanical machining tools (e.g., micro or nano mechanical cutting tools, latches, etc.) can be used to remove portions of the ferrule end face to expose desired fiber protrusion lengths. Micro or nano robotics may be used to implement such micromechanical machining techniques. Also, micro-machining techniques can use etching techniques such as chemical or plasma etching. Other types of plasma based removal techniques can also be used. Moreover, ablation tools using electromagnetic wave-based energy streams (e.g., pulsed, continuous) other than laser light can also be used.

The invention claimed is:

1. A method for processing a multi-fiber ferrule for a multi-fiber fiber optic connector, the multi-fiber ferrule including a ferrule body having a distal end and a proximal end, the ferrule body also defining a plurality of openings that extend through the ferrule body from the proximal end to the distal end, the ferrule body having a plurality of optical fibers potted within the openings, the method comprising:

removing a portion of a distal end face of the ferrule using a micro-machining process in which a plurality of laser beam pulses are directed at the distal end face of the ferrule to cause removal of the portion of the distal end face, and wherein the laser beam pulses have a power density selected such that the plurality of laser beam pulses are not capable of ablating glass, and wherein the plurality of laser beam pluses ablate outer layers of the distal face of the ferrule without ablating the plurality of optical fibers potted within the openings of the ferrule body.

2. The method of claim 1, wherein removal of the portion of the distal end face of the ferrule alters a distance the optical fibers protrude outwardly from the distal end face of the ferrule body.

3. The method of claim 1, wherein removal of the portion of the distal end face of the ferrule creates recessed regions on opposite sides of a central region of the distal end face of the ferrule.

4. The method of claim 1, wherein the end face of the ferrule is polished after the micro-machining process.

5. The method of claim 1, further comprising laser cleaving the optical fibers.

6. The method of claim 1, wherein the optical fibers are cleaved with a laser beam having a substantially different wavelength than corresponding wavelengths of the laser beam pulses used to micro-machine the distal end face of the ferrule.

7. The method of claim 1, wherein the laser beam pulses have wavelengths in the range of 200-3000 nanometers.

8. The method of claim 7, wherein the laser beam pulses have focal spot intensities in the range of $10^3$ to $10^9$ watts per $cm^2$ and interaction times in the range of $10^9$ to $10^{-3}$ seconds.

9. The method of claim 1, wherein the optical fibers are polished flush with the distal face of the ferrule body before the micro-machining process, and wherein the optical fibers protrude distally outwardly from the distal end face of the ferrule after the micro-machining process.

10. A method for creating a fiber protrusion at a distal end face of a ferrule, the method comprising:

directing a plurality of laser beam pulses at a distal end face of the ferrule to ablate a distal layer of ferrule material from the ferrule without ablating the optical fiber, wherein after the distal layer has been ablated the optical fiber projects distally outwardly from the ferrule a distance equal to a thickness of the ferrule layer removed by the plurality of laser beam pulses, wherein the plurality of laser beam pulses achieve substantially full coverage of the distal end face of the ferrule upon completion of the plurality of laser beam pulses.

11. A ferrule comprising:
a ferrule body having a distal end position opposite from a proximal end, the ferrule body defining a plurality of openings that extend through the ferrule body from the proximal end to the distal end, distal end of the ferrule body defining a distal end face;
a plurality of optical fibers potted within the openings of the ferrule body, the optical fibers having distal end portions that protrude distally outwardly from the distal end face of the ferrule body;
wherein the distal face of the ferrule body has a laser ablated distal surface, and
wherein the laser ablated distal surface is formed by a laser beam having a power density selected such that the laser beam is not capable of ablating glass, and wherein the laser beam ablates outer layers of the distal end face of the ferrule without ablating the plurality of optical fibers potted within openings of the ferrule body.

12. A method for processing a multi-fiber ferrule for a multi-fiber fiber optic connector, the multi-fiber ferrule including a ferrule body having a distal end and a proximal end, the ferrule body also defining a plurality of openings that extend through the ferrule body from the proximal end to the distal end, the ferrule body having a plurality of optical fibers potted within the openings, the method comprising:
removing material from a first surface area at a distal end face of the ferrule using a mechanical polish process directed at the first surface area of the distal end face of the ferrule, and
using a micro machining process to apply a laser beam to an entirety of the first surface area, wherein the laser beam has a power density selected such that the laser beam is not capable of ablating glass, and wherein the laser beam ablates outer layers of the distal face of the ferrule without ablating the plurality of optical fibers potted within the openings of the ferrule body.

13. The method of claim 12 wherein the micromachining process uses an electromagnetic wave based energy stream to remove the portion of the distal end face.

14. The method of claim 12 wherein the wherein the micromachining process uses plasma to remove the portion of the distal end face.

15. The method of claim 12 wherein the wherein the micromachining process uses an etching technique to remove the portion of the distal end face.

16. The method of claim 12 wherein the micromachining process uses a micro-mechanical technique to remove the portion of the distal end face.

17. A method for processing a fiber ferrule for a fiber optic connector, the fiber ferrule including a ferrule body having a distal end and a proximal end, the ferrule body also defining an opening that extends through the ferrule body from the proximal end to the distal end, the ferrule body having an optical fiber potted within the opening, the method comprising:
removing material from a first surface area at a distal end face of the ferrule using a mechanical polish process directed at the first surface area of the distal end face of the ferrule, and
using a micro machining process to apply a laser beam to an entirety of the first surface area, wherein the laser beam has a power density selected such that the laser beam is not capable of ablating glass, and wherein the laser beam ablates outer layers of the distal face of the ferrule without ablating the optical fiber potted within the ferrule body.

18. A method for creating a fiber protrusion at a distal end face of a ferrule, the method comprising:
directing a plurality of energy pulses at a distal end face of the ferrule to ablate a distal layer of ferrule material from the ferrule without ablating the optical fiber, wherein after the distal layer has been ablated the optical fiber projects distally outwardly from the ferrule a distance equal to a thickness of the ferrule layer removed by the plurality of energy pulses,
wherein the plurality of energy pulses have a power density selected such that the plurality of energy pulses are not capable of ablating glass, and wherein the plurality of energy pulses ablate outer layers of the distal end face of the ferrule without ablating the optical fiber.

* * * * *

UNITED STATES PATENT AND TRADEMARK OFFICE
CERTIFICATE OF CORRECTION

PATENT NO. : 8,740,474 B2  
APPLICATION NO. : 13/445096  
DATED : June 3, 2014  
INVENTOR(S) : Yu Lu Page 1 of 1

It is certified that error appears in the above-identified patent and that said Letters Patent is hereby corrected as shown below:

IN THE CLAIMS

Col. 6, line 53, claim 8: "the range of $10^9$ to $10^{-3}$ seconds." Should read --the range of $10^{-9}$ to $10^{-3}$ seconds--

Signed and Sealed this  
Tenth Day of March, 2015

Michelle K. Lee  
*Deputy Director of the United States Patent and Trademark Office*